United States Patent [19]
Nanbu et al.

[11] Patent Number: 5,996,513
[45] Date of Patent: Dec. 7, 1999

[54] MACHINE FOR TRANSPLANTING SEEDLINGS

[75] Inventors: Tetsuo Nanbu; Hidekazu Terasawa; Yasunobu Kawamoto, all of Obihiro, Japan

[73] Assignee: Nihon Tensaiseito Kabushiki Kaisha, Tokyo, Japan

[21] Appl. No.: 09/042,662

[22] Filed: Mar. 17, 1998

[30] Foreign Application Priority Data

| Aug. 26, 1997 | [JP] | Japan | 9-244672 |
| Aug. 26, 1997 | [JP] | Japan | 9-244675 |
| Aug. 26, 1997 | [JP] | Japan | 9-244676 |
| Dec. 25, 1997 | [JP] | Japan | 9-366998 |

[51] Int. Cl.$^6$ .............................................. A01C 11/00
[52] U.S. Cl. .................................. 111/105; 111/111; 47/77
[58] Field of Search ............................... 111/104, 105, 111/109, 111; 171/61; 271/216; 414/417, 404, 416; 47/901, 73, 77; 221/79

[56] References Cited

U.S. PATENT DOCUMENTS

| 2,980,041 | 4/1961 | Nielsen ........................ 111/105 X |
| 3,719,158 | 3/1973 | Roths ............................ 111/105 |
| 4,122,784 | 10/1978 | Joswig .......................... 111/105 X |
| 4,167,911 | 9/1979 | Masuda et al. ................. 111/105 |
| 4,395,846 | 8/1983 | Gjertz et al. ................... 111/105 X |
| 4,455,950 | 6/1984 | Pretzer ........................... 111/105 |
| 4,788,920 | 12/1988 | Shaw ............................. 111/105 |
| 5,201,910 | 4/1993 | Sheeter .......................... 111/104 X |

FOREIGN PATENT DOCUMENTS

| 58-11817 | 1/1983 | Japan . |
| 63-61886 | 3/1988 | Japan . |
| 1-205687 | 8/1989 | Japan . |
| 4-79612 | 3/1992 | Japan . |
| 5-308822 | 11/1993 | Japan . |
| 7-123869 | 5/1995 | Japan . |
| 8-89028 | 4/1996 | Japan . |

*Primary Examiner*—Victor Batson
*Attorney, Agent, or Firm*—Oliff & Berridge, Plc

[57] ABSTRACT

A strips peeling off apparatus and a carrying conveyor are disposed on a body of a machine for transplanting seedlings. A series of pots is taken out from a multiple series of pots 1 placed on the body through a pair of guide plates by pulling two strips with a pair of taking-out rollers through the pair of guide members toward the front side of the body to expose the seedlings with soil exposed from the pots of the series of pots. The seedlings with soil are carried toward the rear end side at the same velocity as the velocity of the body by clamping the root block portion of the seedling with a first conveyor, and subsequently, with a second conveyor, by clamping the leaf portions of the seedlings to carry the seedlings toward the rear side of the body into a planting groove formed by an opener mounted below the body.

15 Claims, 11 Drawing Sheets

MACHINE FOR TRANSPLANTING SEEDLINGS

BACKGROUND OF THE INVENTION

1. Field of Invention This invention relates to a machine of the type placed on the ground which holds seedlings grown in a series of pots and transplants them onto a field. The series of pots are formed by two strips of paper bonded together using a water soluble paste thereby forming the pots therebetween at a given pitch and linked together.

2. Description of Related Art

A series of pots, for example, are disclosed in Japanese Patent Publication Nos. 58-11817 and 4-79612. The pots are initially, during non-use, pressed flat together, and prior to use are arranged in a series to form a honeycomb of like pots, which are accommodated in a box filled with soil and sown. This allows many seedlings to be grown concentrically. According to this seedling growing method using a series of pots, every seedling is grown in a pot independently so as to avoid the entanglement of roots between the seedlings. In addition, the water soluble paste deteriorates a given number of days after the seedlings are planted and begin growing, but allow the seedlings to be drawn out in a row from the overlapped series of pots filled with soil so that the seedlings can be transplanted continuously.

In general, the seedlings grown using a series of pots are transplanted with the pots remaining linked together, and conventionally, a transplanting machine has been developed for this exclusive use. For example, the transplanting machines described in Japanese Patent Laid-open Nos. 5-308822 and 8-89028 comprises a body provided at its rear end, opposite to an advancing direction, with an opener for making a groove for transplanting. The body comprises a simple structure having a potted seedlings placing section for receiving the above-discussed series of pots, a potted seedlings guide section for guiding a series of pots drawn out in a row from the potted seedlings placing section and a seedlings feeding section for feeding seedlings from the potted seedlings guide section onto the field. Due merely to the moving of the body on the field, the potted seedlings are fed continuously into the groove formed by the opener to easily transplant the seedlings.

However, multiple series of pots are formed with series of pots overlapping each other with the pitch between the pots limited to the length of a connection portion (piece) of a pot, i.e. a side of a pot. Thus, when using a planting machine described in the above-mentioned publications, the pitch between seedlings is limited to the length of the piece, so that if that pitch is too small, the machine has to be resigned.

Further, for instance, in the case of Japanese Patent Publication No. 63-61886, a transplanting machine is described in which a row of seedling pots is clamped by a pair of rotary transplantation bars and is separated from the following seedling pot by cutting the connection piece therebetween to transplant the separated seedling pot into the groove. While the pitch between seedlings can be changed, the transplanting machine itself becomes complicated and large-scaled and can not be used simply.

Furthermore, for instance, in the case of Japanese Patent Laid-open No. 7-123869, in order to extend the connection piece, a plurality of cuts are provided in the side of the pot or in the connection piece, or in Japanese Patent Laid-open No. 1-205687, the connection piece is made longer than a side of the pot and folded along the length of the side of the pot to which it is attached using a water-soluble paste, thereby when transplanting the pitch is extended. However, in either case there have been the following problems. For instance in the former case, during transplanting, the connection piece is apt to be separated unintentionally due to the resistance against the taking out force, while in the latter case, the manufacture of a series of pots is complicated and the manufacturing cost is high.

SUMMARY OF THE INVENTION

The present invention has been made in light of the above problems and the purpose of which is to provide a transplanting machine in which a pitch of the seedlings grown using a series of seedling pots can be changed arbitrarily and simply when transplanting. To attain the above purpose, a transplanting machine which, using a multiple series of pots formed by two strips bonded together using a water soluble paste to form therebetween the pots linked together at a given pitch, transplants the seedlings grown in the multiple series of pots, comprises a body provided at its rear end in an advancing direction thereof with an opener for forming a groove for transplanting. On the body, in order from a front side in an advancing direction, there are a seedling pots placing section where the above mentioned multiple series of pots are placed; a series of seedling pots guide section for guiding a series of pots taken out in a row from the placing section; a two strips peeling off apparatus, which peels off the two strips to the right and left to expose the potted seedlings; and a carrying conveyor, which carries the seedling and its soil fed from the peeling off apparatus clamped and kept upright toward the rear side of the body. In accordance with the movement of the body, the peeling off apparatus and the carrying conveyor are operated to continuously feed the seedlings into the groove formed by the opener.

In the transplanting machine thus described, since the two strips of papers are peeled off to expose the seedling with its soil therein, which is carried by the conveyor to transplant seedlings into the planting groove, by changing the velocity ratio between the peeling by the strips peeling off apparatus and the carrying by the carrying conveyor, the pitch between seedlings to be planted can be arbitrarily changed. In addition, if the velocity of the conveyor is set approximately identical with the moving velocity of the body, the seedlings with their soil may stand still on the field, which avoids the seedlings receiving any inertia during transplant onto the field and thus falling.

In the present invention, rolling wheels may be provided on the body, which roll on the field according to the movement of the body and may be used as a power source for the strips peeling off apparatus and the carrying conveyor. When the rolling wheels are used as a power source, there is no need for a special power source, such as, for example, a motor. Also, the strips peeling off apparatus and the carrying conveyor can be synchronized with the moving velocity of the body.

Further, in the present invention, the strips peeling off apparatus is preferably configured so that as it takes up the peeled strips in the advancing direction of the body. Thus constructed, an extended portion of the potted seedlings guide section is not occupied by the strips peeling off apparatus and the carrying conveyor can be located near where the seedlings are exposed by the strips peeling off apparatus. Thus, there is no need for a special means to convey the seedlings to the carrying conveyor.

In the present invention, the above-discussed carrying conveyor can be structured to clamp the seedlings fed from the strips peeling off apparatus by its leaf portion. By clamping the seedling so that the seedling and its soil hangs down vertically due to its weight, the seedlings can be prevented from falling over when fed into the groove.

Further, in the present invention, the above-discussed carrying conveyor can comprise a first conveyor for carrying the seedling fed from the strips peeling off apparatus by clamping its root block portion and a second conveyor for carrying the seedling by clamping its leaf portion, wherein the initial portion of the second conveyor overlaps the end portion of the first conveyor.

In the case where the carrying conveyor is structured as a double conveyor, as discussed above, since the first conveyor clamps the root block portion of the seedlings fed from the strips peeling off apparatus, if the leaf portion of the seedling fed out from the strips peeling off apparatus and the leaf portion of the following seedling fed out of the strips peeling off apparatus from the seedlings guide portion overlap each other, it is not a problem to pull out the leaf portion of the following seedling. Thus, a stable carrying of each of the seedlings with its soil is carried out.

In addition, since the initial portion of the second conveyor overlaps the end portion of the first conveyor, the second conveyor clamps firmly the leaf portion of the seedlings and soils before the seedling leaves the first conveyor, the seedlings do not fall down during carrying. Further, the above conveyor is structured to decline rearward so that it can feed the seedlings with their soil near the field to prevent the seedlings from falling over.

In this invention, it is preferable to structure the carrying conveyor as a pair of conveyors so that the seedlings with soil are clamped simply.

DETAILED DESCRIPTION OF PREFERRED EMBODIMENTS

Figure 1:
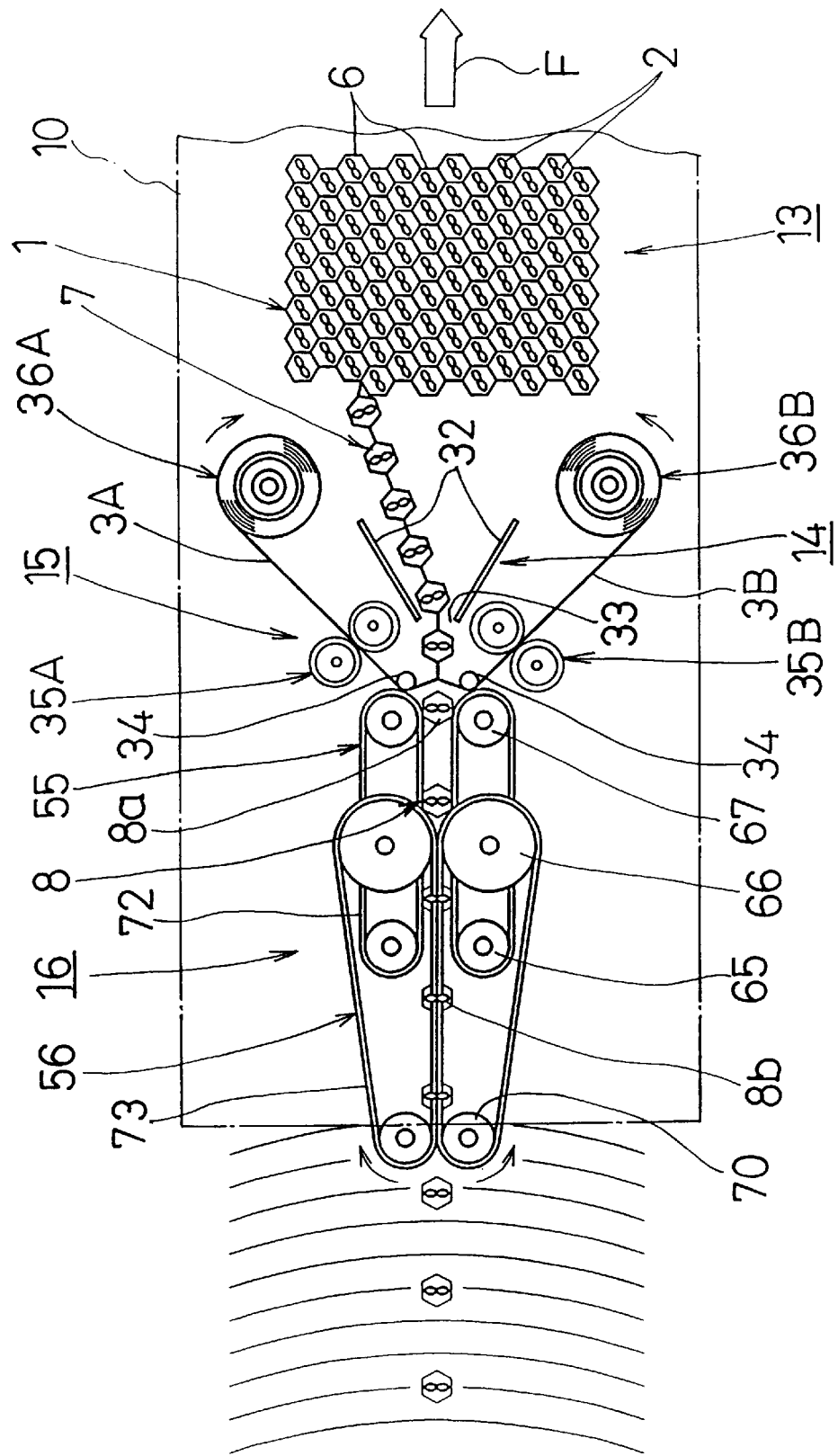
FIG. 1 is a plan view of the main portion of a machine for transplanting according to a first embodiment of the present invention.

Hereinafter, embodiments of the present invention are explained based on the attached drawings.

FIGS. 1–4 show a total structure of a machine for transplanting according to a first embodiment of the present invention. The machine for transplanting is for transplanting continuously a seedling 2 grown in a multiple series of pots 1. The machine for transplanting comprises a body 10 having a ground sliding plate 11 provided at a rear side in an advancing direction F and an opener 12. A potted seedlings placing section 13 is provided on the body 10, at a front side in the advancing direction F on which the above mentioned multiple series of potted seedlings 1 are placed.

Figure 5:
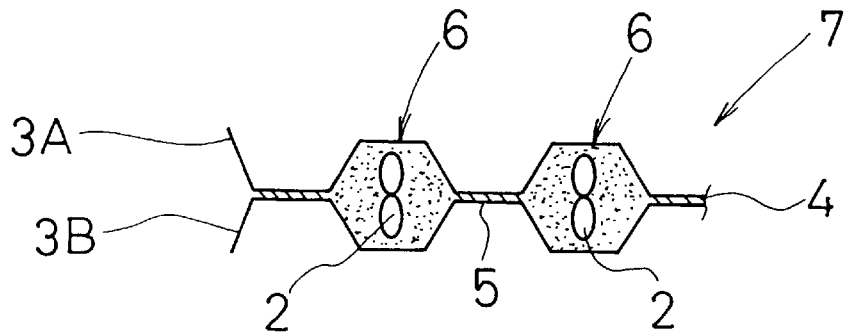
FIG. 5 is a plan view showing multiple series of potted seedlings with soil.

The multiple series of pots 1, as shown in FIG. 5, are formed by two strips of paper 3A, 3B bonded with a water resistant paste at a given pitch to form pots 6 between the bonded portions (connecting piece). A series of pots 7 are overlapped using a water soluble paste. The details of the forming of the series of pots 7 are disclosed in Japanese Publication Nos. 58-11817 and 4-79612, so that a detailed explanation is omitted here. The multiple series of pots 1 are stored in a pressed-flat manner and when developed, a plurality of pots 6 looks like a honeycomb. When growing the seedlings, they are accommodated in a seedling box (not shown). Then, the series of pots 1 are filled with soil and sown using an exclusive machine for automatically filling soils and sowing. For example, in a greenhouse a concentrated management for growing is carried out. Since every seedling 2 grows independently in a pot 6, mutual entanglement of roots does not occur. Also, the above-mentioned water soluble paste deteriorates due to the sprinkling of water at the time of growing the seedling.

After the seedlings have been grown, a series of pots 7 to form a overlapped multiple series of pots 1 is placed on the potted seedlings placing section 13 of the body 10. The series of pots 7 are separated easily and taken out in a row as shown in FIG. 1. For reference, the multiple series of pots 1 may be displaced from a seedling box (not shown) onto the potted seedlings placing section 13 or put on there while accommodated in the seedling box. In the latter case, adjacent edges of boxes may be bridged by connecting plates (not shown) for joining the edge(s) of a series of pots 7 so as to be displaced easily.

Figure 3:
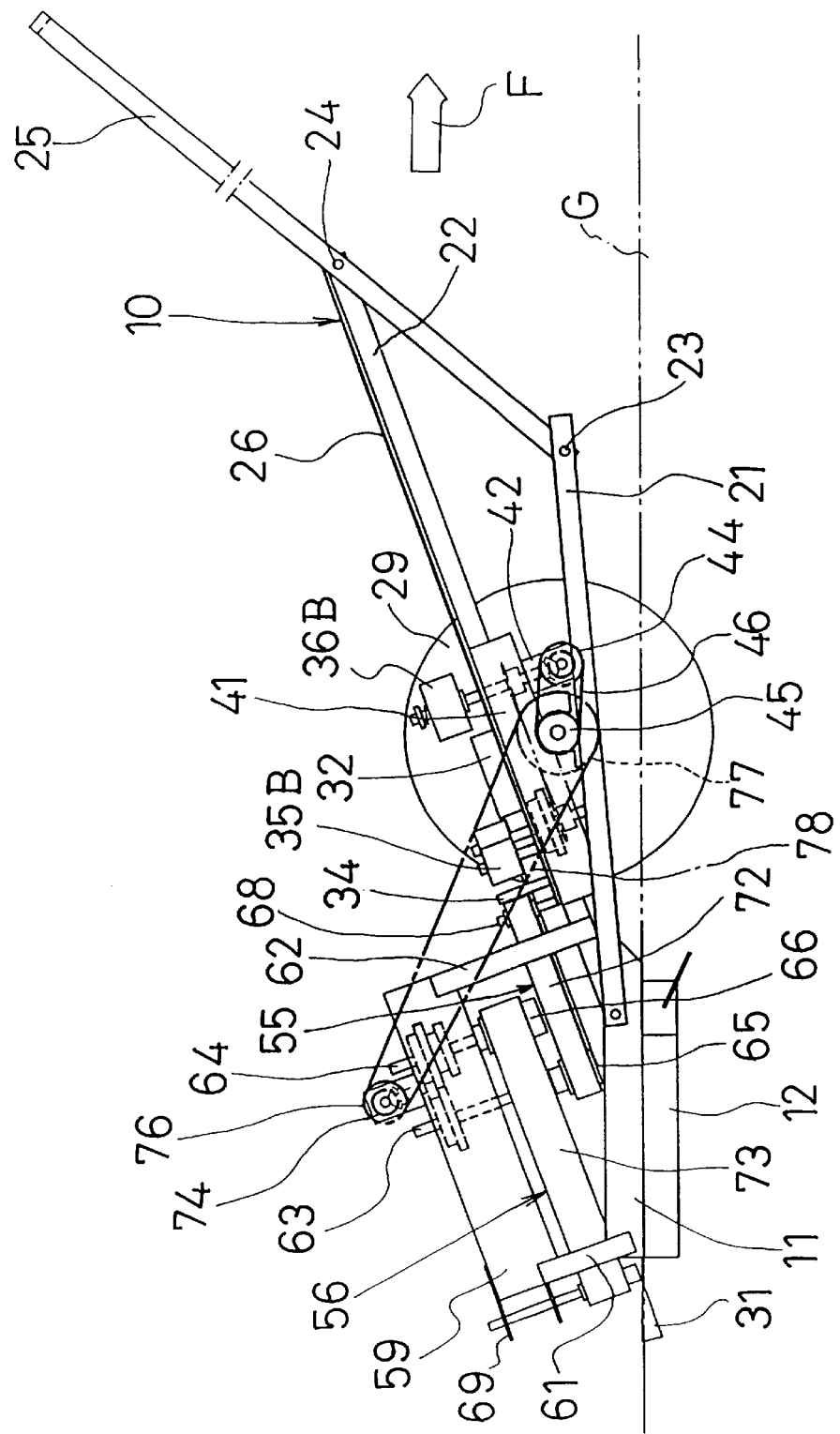
FIG. 3 is a side view showing the total structure of the machine for transplanting according to a first embodiment of the present invention.

Turning back to the structure of the transplanting machine, on the body 10, from the front side in the advancing direction F (hereinafter, the front side in advancing direction F is referred to as a front side of the body, and an opposite side is referred to as a rear side of the body) in order, are located: a potted seedling guide section 14, which guides in a row a series of pots taken out from the strips peeling off apparatus 15, which peels off two strips 3A and 3B of the series of pots 7 rightward and leftward to expose the seedling 2 with soil of the pot 6; and a carrying conveyor 16, which carries the seedlings 8 with soil fed from the strips peeling off apparatus 15 while maintaining the seedlings 8 vertically oriented. The body 10 further comprises a pair of first supporting frames 21 and a pair of second supporting frames 22. One end thereof of each of the pair of first supporting frames 21 and the pair of second supporting frames 22 are fixed by a shaft 20 (FIG. 4) to the ground gliding plate 11 and the other ends thereof are extended toward the front side of the body. The body 10 also includes a handle frame 25 having a T-letter form, one end of which is connected to the first supporting frames 21 by a shaft 23 (FIG. 4) and an intermediate portions of which is connected to the second supporting frames 22 by a shaft 24 (FIG. 3). A supporting plate 26 is fixed on an upper surface of the second supporting frames 22. The second supporting frames 22 are located inside the first supporting frames 21 and are inclined upward toward the front side of the body from the ground sliding plate 11. Accordingly, the supporting plate 26 fixed on the second supporting frames 22 is declined downward toward the rear side of the body.

Between the pair of first supporting frames 21, a wheel shaft 28 is bridged through bearings 27 (FIG. 4), both ends of which are extended outside the first supporting frames 21 through the bearings provided with the rolling wheels 29. The size of the rolling wheels 29 are formed in such a manner as to sink a little under the field surface G when the ground gliding plate 11 is as a whole in contact with the field surface G. When the body 10 is moved on the field surface G while the ground gliding plate 11 is in contact with the field surface G, the rolling wheels 29 roll on the field surface G.

Figure 6:
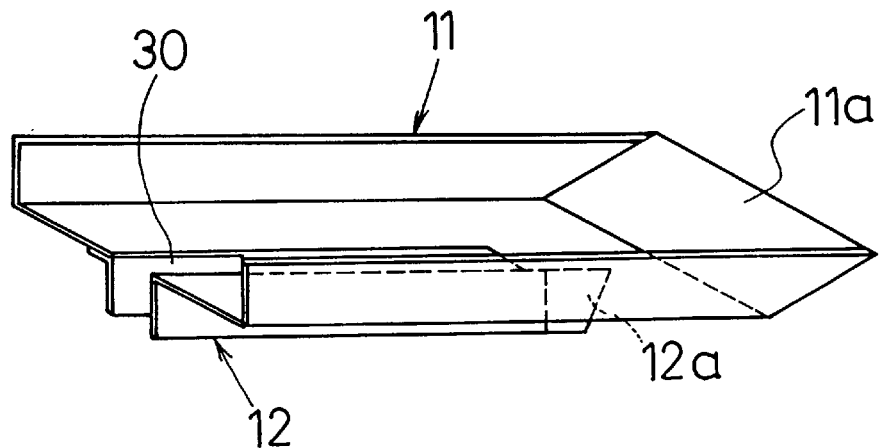
FIG. 6 is a perspective view showing an assembly structure of a ground sliding plate with an opener used in the present invention.

The ground gliding plate 11, as shown in FIG. 6, is configured like a boat with an inclined wall 11a, a tip end side of which is directed toward the front side of the body 10. The ground gliding plate 11 is provided with a rectangular opening 30 formed on the intermediate portion of the bottom, widthwisely from the rear end thereof toward the inclined wall 11a. The opening 30 is used as an outlet at the time of feeding the seedlings 8 with soil onto the field surface G, which are carried by the carrying conveyor 16, and the width of the opening is formed only sufficiently wide for the seedlings 8 with soil to pass through it. The opener 12 is of two sheets of rectangular plate which hang from both longitudinal edges of the opening 30. The tip ends of the plates directed toward the front side of the body are closed sharply to form a sharp end portion 12a, while the rear ends thereof are opened so that a spacing formed by the two rectangular plates is adapted to the opening 30. Therefore, the seedlings 8 with soil pass through the opening 30, enter into the spacing and are grounded on the bottom of the planting groove S (FIG. 2) formed by the opener 12. The ground gliding plate 11 is provided with a pair of soil collecting plates 31, which extend rearward at the rear portion of the body 10 in such a manner as to cover the width of the opening 30.

The above potted seedling guide section 14 is provided with a pair of guide plates 32 disposed on the supporting plate 26 on the body 10. The pair of guide plates 32 are opened sufficiently wide at the front side of the body and are narrowed at the rear side of the body to form a gate 33. A series of pots 7 taken out from the potted seedlings placing section 13 are taken out through the narrow gate 33 formed by the pair of guide plates 32.

Figure 8:
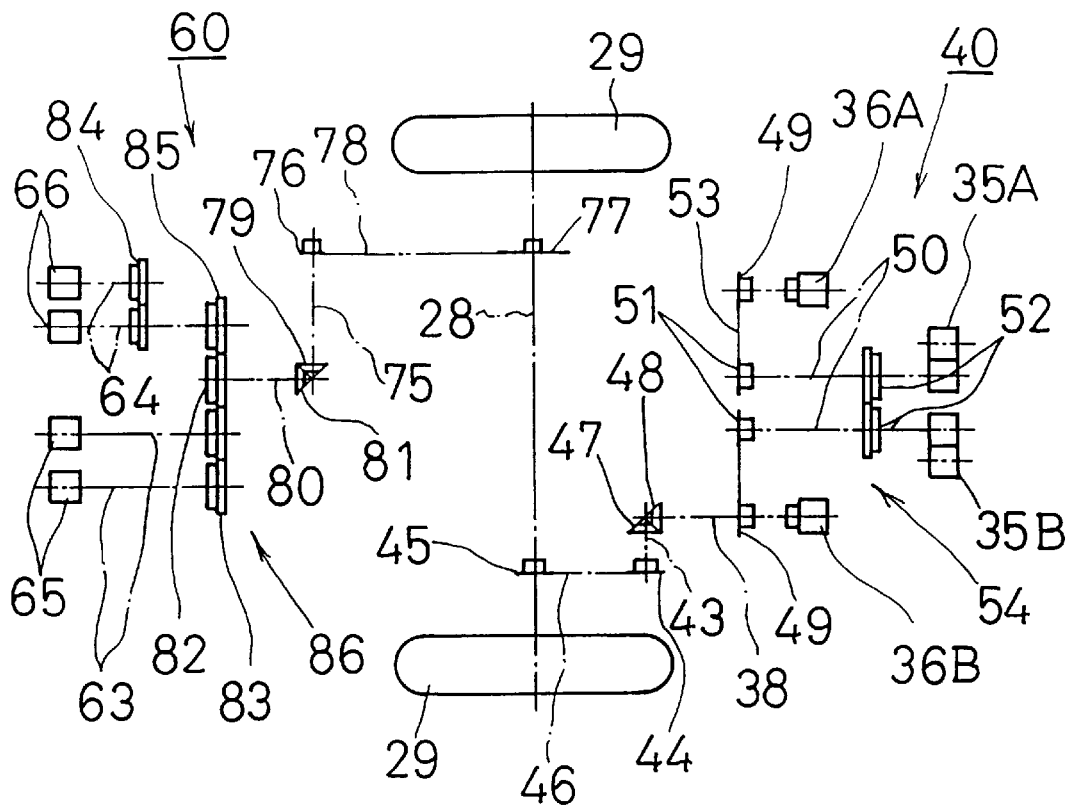
FIG. 8 is a schematic view showing a driving mechanism structure used in the first embodiment of the present invention.

Further, the above-discussed strips peeling off apparatus 15 comprises a pair of guide members 34 disposed opposite to the gate 33 of the potted seedlings guide section 14; a pair of taking-out rollers 35A, 35B and a pair of winding reels 36A, 36B. The pair of taking-out rollers 35A, 35B and the pair of winding reels 36A, 36B are synchronized and driven with a latter-mentioned driving mechanism 40 (FIG. 8). Two strips 3A and 3B peeled off to the right and left from a series of pots 7 are guided toward the front side around by the pair of guide members 34 and wound around corresponding winding reels 36A, 36B respectively. Each of the taking-out rollers 35A, 35B comprises a pair of rollers, each provided with a concave-convex, such as serration, in order to increase a friction resistance between the strips 3A, 3B and the rollers.

Figure 7:
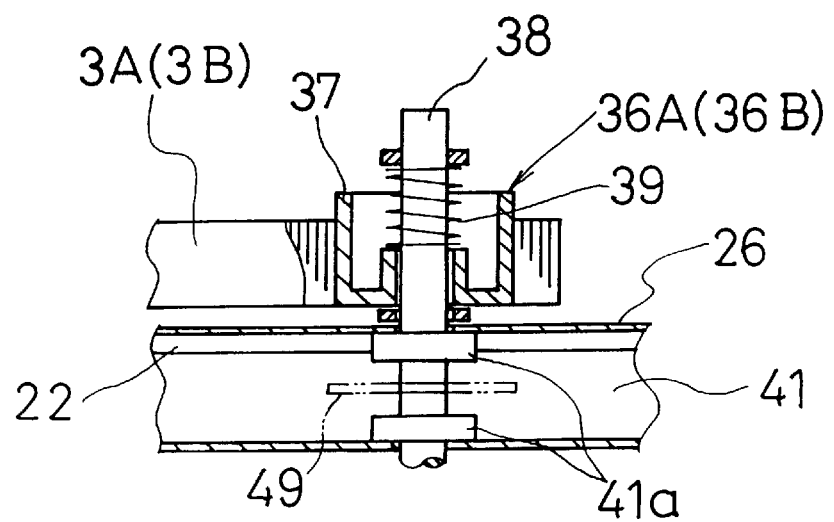
FIG. 7 is a sectional view showing a winding reel in the strips peeling off apparatus used in the first embodiment of the present invention.

The circumferential velocity of each winding reel 36A, 36B is changed according to the winding number (the winding diameter) of the strips 3A, 3B wound thereon, if the number of rotation is constant. Since there is a difference between the winding velocity and the taking-out velocity of the strips 3A, 3B by the pair of taking-out rollers 35A, 35B, if the winding reels 3A, 3B are urged to continue to rotate, the peeling off velocity of the strips 3A, 3B due to the strips peeling off apparatus 15 becomes larger than expected or the strips 3A, 3B are cut off. Therefore, in the first embodiment of the present invention, as shown in FIG. 7, every reel body 37 of the winding reels 36A, 36B is assembled independently around a rotary shaft 38 and are connected to a coil spring 39. With this construction when the winding diameter increases, the coil spring is distorted toward a winding direction and the reel body 37 rotates free of the rotary shaft 38 so that the winding speed adapts to the taking-out speed of the strips 3A, 3B by the pair of taking-out rollers 35A, 35B. The rotary shaft 38 is supported with a pair of bearings 41a in a later-discussed gear box 41 for the use of the strips peeling off apparatus 15.

Figure 4:
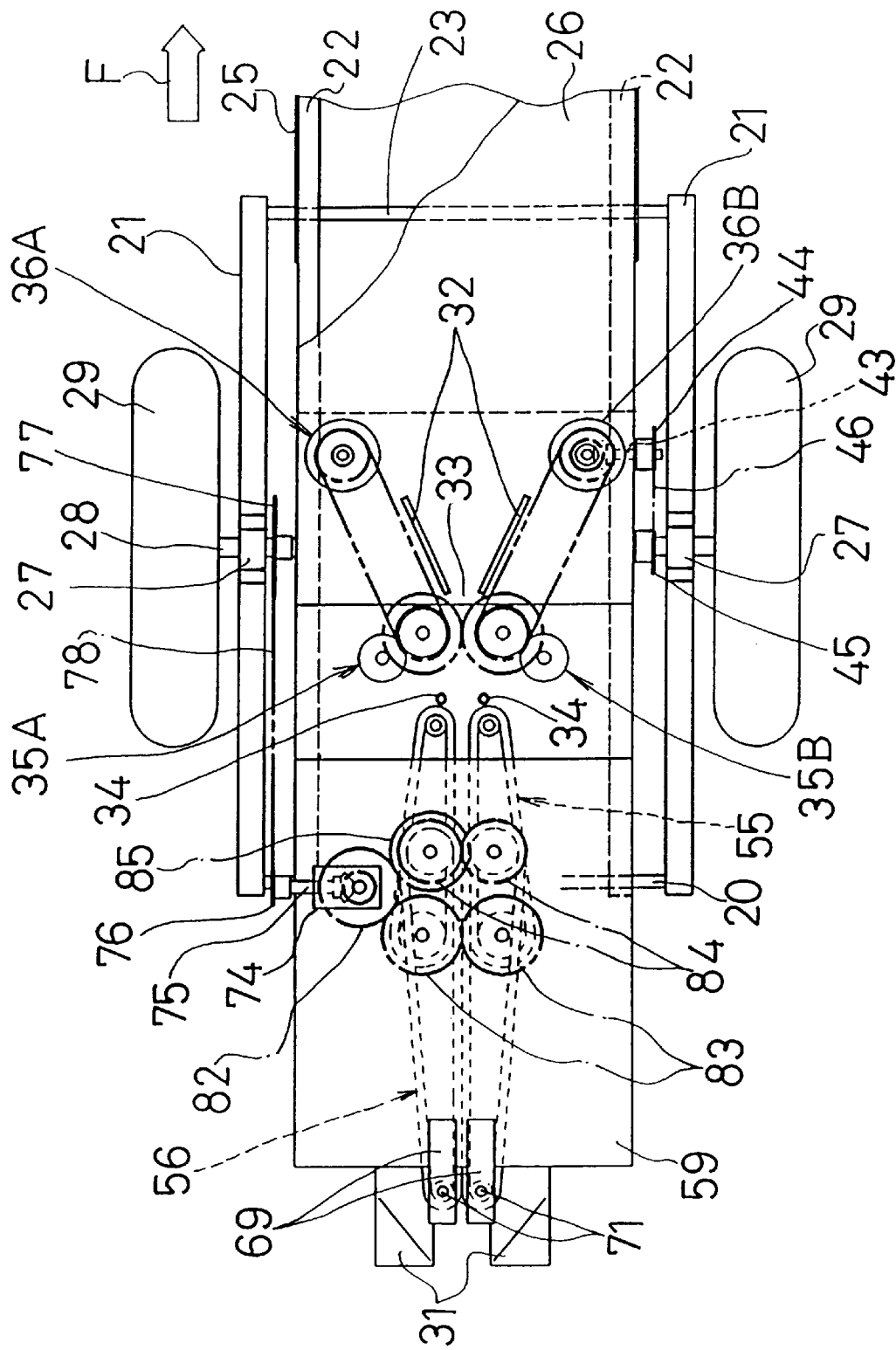
FIG. 4 is a plan view showing the total structure of the machine for transplanting according to a first embodiment of the present invention.

The gear box 41 for the strips peeling off apparatus 15 is fixed, as shown in FIG. 3, to the second supporting frames 22 of the body 10, and the above-mentioned supporting plate 26 is used as an upper plate of the gear box 41. A small gear box 42 is also provided under the gear box 41, where, as shown in FIGS. 4 and 8, a horizontal shaft 43, which horizontally extends in the widthwise direction of the body 10, is rotatably supported. The horizontal shaft 43 is provided with a sprocket 44 on one end, which projects from the small gear box 42. A chain 46 is engaged on the sprocket 44, which is also engaged with a sprocket 45 mounted on the wheel shaft 28 of the rolling wheels 29. A bevel gear 47 is mounted on the other end of the horizontal shaft 43 in the small gear box 42, which is engaged with a bevel gear 48 mounted on the lower end of the rotary shaft 38 (FIG. 7) of one of the winding rollers 36B. That is, the rotation of the rolling wheels 29 is transmitted to the horizontal shaft 43 through the sprockets 45, 44 and the chain 46 and to the rotary shaft 38 through the bevel gears 47 and 48.

Within the gear box 41, a sprocket 49 is mounted on every rotary shaft 38 of the winding reels 36A, 36B, a sprocket 51 is mounted on every rotary shaft 50 of the taking-out rollers 35A, 35B, and a gear 52 and a driving force transmitting mechanism 54, including the chain connecting the sprockets 49 and 51, are disposed (FIG. 8). This driving force transmitting mechanism 54, the horizontal shaft 43, the chain 46, the rolling wheels 29 and so on constitute the above-mentioned driving mechanism 40 and the rolling wheels 29 are used as a driving power source for the taking-out rollers 35A, 35B and the winding reels 36A, 36B. The rolling wheels 29 roll on the field, as mentioned above, while the ground gliding plate 11 contacts the field surface G and is displaced in the advancing direction F of the body 10, and according to the movement of the body 10, the pair of taking-out rollers 35A, 35B and the pair of winding reels 36A, 36B are rotated. For reference, in the driving mechanism 40 its gear ratio or pulley ratio are set so that the peeling off velocity of the strips 3A, 3B by the strips peeling off apparatus 15 is sufficiently reduced according to the moving velocity of the body 10.

Further, the above-discussed carrying conveyor 16 includes a first conveyor 55, which carries the seedlings with soil fed from the strips peeling off apparatus 15 by clamping the roots block portion 8a thereof, and a second conveyor 56, which carries the seedling 8 with soil by clamping the leaf portion 8b. The first conveyor 55 is positioned so that a forward end is disposed adjacent to the pair of guide members 34 of the strips peeling off apparatus 15, while a leading end of the second conveyor 56 is disposed so as to overlap a trailing end of the first conveyor 55. In this first embodiment, the first and second conveyors 55 and 56 consist of a pair of conveyors respectively and are rotated by a driving mechanism 60 (FIG. 8) accommodated in a gear box 59 disposed above the ground gliding plate 11 of the body 10.

Figure 2:
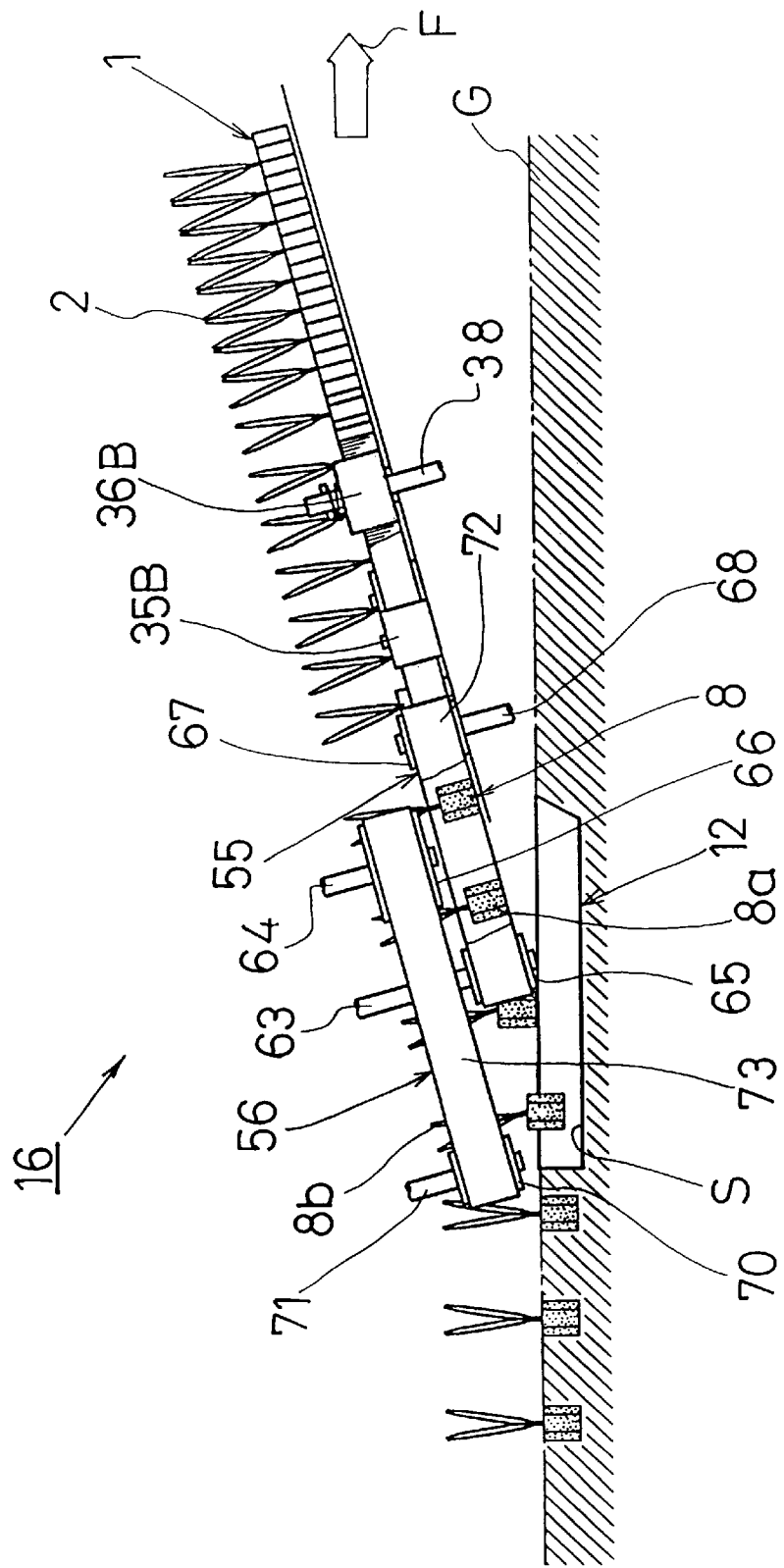
FIG. 2 is a side view of the main portion of a machine for transplanting according to a first embodiment of the present invention.

The gear box 59 is fixed to the upper ends of brackets 61, 62 (FIG. 3), which extend upward from the ground gliding plate 11 and the second supporting frames 22. The whole structure is inclined downward toward the rear end of the body 10 like the supporting plate 26 on the second supporting frame 22. In the gear box 59, two pair of rotary shafts 63, 64 are rotatably supported through bearings (not shown) perpendicularly to the upper and lower plates. The two pair of rotary shafts 63, 64 are disposed along the longitudinal direction of the body 14 juxtaposed with each other, and the lower ends thereof extend largely downward from the gear box 59. The lower ends of one pair of rotary shafts 63 disposed at the rear side of the body are provided with driving pulleys 65 of the first conveyor 55, and the lower ends of the other pair of rotary shafts 64 are provided with driving pulleys 66 of the second conveyor 56 respectively (FIGS. 2 and 3).

The supporting plate 26 of the second supporting frames 22 is provided with a pair of supporting shafts 68, which support the following pulleys 67 of the first conveyor 55 adjacent to the pair of guide members 34 in the strips peeling off apparatus 15. At the rear end of the gear box 59 a pair of supporting shafts 71 (FIGS. 2 and 3) for supporting the following pulleys 70 of the second conveyor 56 are mounted using a bracket 69. Each of the first and second conveyors 55, 56 are respectively provided with a pair of endless belts 72, 73 engaged around the driving pulleys 65, 66 and the following pulleys 67, 70. The spacing of the pair of the endless belts 72 of the first conveyor 55 is adapted to clamp and convey the root block portion 8a of the seedling 8 with soil and the spacing of the pair of the endless belts 73 of the second conveyor 56 is adapted to clamp and convey the leaf portion 8b of the seedling 8 with soil. Each of the endless belts 72, 73 preferably includes flexible foams of plastic at least on the surface thereof for avoiding damage to the roots block 8a of the seedling 8 or the leaf portion 8b of the seedling 8.

On the gear box 59, as shown in FIGS. 3 and 4, a smaller gear box 74 is provided. In this gear box 74 a horizontal shaft 75 is supported rotatably and extends horizontally in the widthwise direction of the body 10. The horizontal shaft 75 is provided with a sprocket 76 on its one end extending out of the small box 74. A chain 78 is hung on this sprocket 76, which is also hung on the sprocket 77 mounted on the wheel shaft 28 of the rolling wheels 29. On the other end of the horizontal shaft 75 within the small gear box 74, as shown in FIG. 8, a bevel gear 79 is mounted. The bevel gear 79 is engaged with a bevel gear 81 mounted on the upper end of the intermediate shaft 80 extended upward from the inside of the gear box 59. The rotation of the rolling wheels 29 is transmitted to the horizontal shaft 75 through the sprockets 77, 76 and the chain 78, then through both of the bevel gears 79, 81 to the intermediate shaft 80.

Also disposed within the gear box 59, as shown in FIGS. 4 and 8, are the intermediate gear 82 mounted on the intermediate shaft 80, a pair of gears 83 mounted on the pair of rotary shafts 63 of the first conveyor 55, a pair of gears 84 mounted on the pair of rotary shafts 64 of the second conveyor 56 and a driving power transmitting mechanism 86, including transmitting gear 85 for transmitting the rotation of the intermediate gear 82 to one of the rotary shaft 64 of the second conveyor 56. This driving power transmitting mechanism 86, the intermediate shaft 80, the horizontal shaft 75, the chain 78 and the rolling wheels 29 constitute the above-discussed driving mechanism 60 and the rolling wheels 29 function as the driving power source for the first and second conveyors 55, 56. The gear ratio of the driving power transmitting mechanism 86 is selected so that the first and second conveyors 55, 56 rotate at the same velocity. Further, the gear ratio or pulley ratio of the driving mechanism 60 is selected so that the first and second conveyors 55 and 56 carry the seedlings 8 with soil at the same speed as the displacement of the body 10.

Hereinafter, an explanation of the transplanting processes using the machine for transplanting thus constructed will be provided.

Prior to transplanting, a series of pots 7 from a multiple series of pots 1 is placed on the potted seedlings placing section 13. Then, two strips 3A, 3B located at the tip end side of the series of pots 7 are peeled off by hand to an appropriate length. Each of the strips 3A, 3B is pulled around one of the pair of guide members 34 of the strips peeling off apparatus 15 toward the front side of the body 10. Each of the tips of the strips 3A, 3B is held on the reel body 37 (FIG. 7) of the winding reels 36A, 36B respectively, which correspond to the taking-out rollers 35A and 35B. Then, the series of pots 7 are taken out through the gate 33 of the pair of guide plates 32 of the seedling guide section 14 at the rear side of the body 10.

After finishing the above-mentioned process, by grasping the handle frame 25 of the body 10, the body 10 is moved in the advancing direction F so that the ground gliding plate 11 contacts with the field surface G. Then, the rolling wheels 29 mounted on the body 10 roll on the field surface G, the rotation of which is transmitted simultaneously through each of the driving mechanism 40, 60 (FIG. 8) to the strips peeling off apparatus 15 and the carrying conveyor 16. That is, the pair of taking-out rollers 35A, 35B of the strips peeling off apparatus 15 clamp the strips 3A, 3B and apply to them a tension to peel off the strips 3A, 3B to the right and left continuously at the bonded portion 5 (FIG. 5). By this peeling off of two strips 3A and 3B, the seedling 2 in each pot 6 is exposed in turn with its soil and fed as seedling with soil 8 piece by piece toward the carrying conveyor 16. Each of the peeled off strips 3A, 3B is wound by the corresponding winding reel 36A, 36B. At that time, in each of the winding reels 36A, 36B, the reel body 37 is slipped against the rotary shaft 38 in accordance with the increase of the winding diameter, so that the circumferential velocity is self-regulated and the peeling off velocity of the strips 3A, 3B is kept constant.

On the other hand, the carrying conveyor 16 transmitted with the rotation of the rolling wheels 29 through the driving mechanism 60 receives its rotation via the pair of rotary shaft 63, 64, which rotate the pair of driving pulleys 65, 66. Thereby, the first and second conveyors 55, 56 revolve at the same circumferential velocity in the same direction. The seedlings 8 fed from the strips peeling off apparatus 15, because the initial end of the first conveyor 55 is located adjacent the pair of guide members 34, or due to a reaction at the time of the peeling off process, advances between the pair of endless belts 72 of the first conveyor 55. The first conveyor 55 carries the seedling 8 toward the rear side of the body 10 by clamping the root block portion 8a of the seedling 8 with its soil.

The carrying velocity of the first conveyor 55 is selected, as described above, so that it is larger than the velocity of the winding reels 36A, 36B peeling off the two strips 3A, 3B. Thus, the seedlings 8 are carried so as to keep a mutual spacing (pitch) between the seedlings 8 larger than the spacing between the pots 6 in the series of pots 7.

The seedling 8 with its soil carried to the rear side of the body with the first conveyor 55 is clamped at its leaf portion 8b at the trailing end area thereof by the pair of endless belts 73 of the second conveyor 56. The root block portion 8a of each of the seedlings 8 with soils simultaneously with being released from the pair of endless belts 72 of the first conveyor 55, is displaced totally into the second conveyor 56, and is carried further to the rear side of the body 10. Then, since the trailing end of the first conveyor 55 and the initial end of the second conveyor 56 mutually overlap, while the root block 8a of the seedling 8 with soil is still clamped in the first conveyor 55, the second conveyor 56 clamps the leaf portion 8b of the seedling 8 with its soil. This guarantees the receiving and delivering of the seedlings 8 with soil from the first conveyor 55 to the second conveyor 56.

Figure 9:
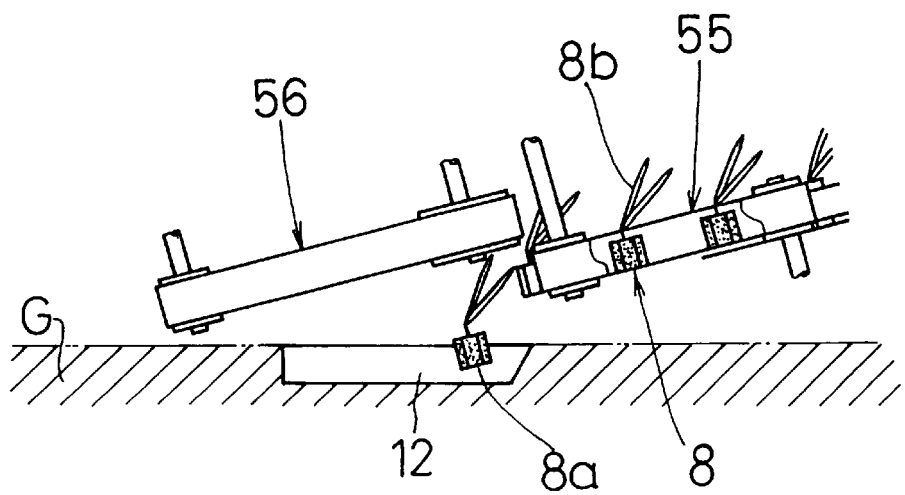
FIG. 9 explains matters to pay attention in manufacturing the first embodiment as a machine for transplanting of the present invention.

For instance, as shown in FIG. 9, if the trailing end of the first conveyor 55 and the initial end of the second conveyor 56 are not overlapped in the case where the leaf portion 8a of the seedling 8 with soil carried by the first conveyor 55 is inclined toward the front side of the body 10, the timing of the receiving and delivering of the seedling 8 is diverged to cause the seedlings 8 with soil to fall down from the carrying conveyor 16.

During the carrying toward the rear side of the body of the seedling 8 with its soil by the second conveyor 56, since the leaf portion 8b is clamped, as shown in FIG. 2, the portion lower than the leaf portion 8b hangs down vertically due to its own weight. Also since the second conveyor 56 is declined toward the rear side of the body, the vertically hanging portion of the seedling 8 with its soil begins to enter into the planting groove S formed by the opener 12 through the opening 30 (FIG. 6) of the ground gliding plate 11 during carrying. The seedling 8 with its soil touches the field at the stage where the seedling 8 with its soil is carried near the trailing end of the second conveyor 56, and is then released from the second conveyor 56 and stands on the bottom of the groove S. Then, in accordance with the moving of the body 10, the seedling 8 with its soil is released from the opener 12, and the root block portion 8a is completely buried by the soil collected with the soil collecting plate 31. Since the seedlings 8 with soil are carried at a spacing greater than the mutual spacing of the pots 6 in the series of pots 7, as stated above, the pitch of the seedlings 8 planted in the field G becomes sufficiently great.

Figure 10:
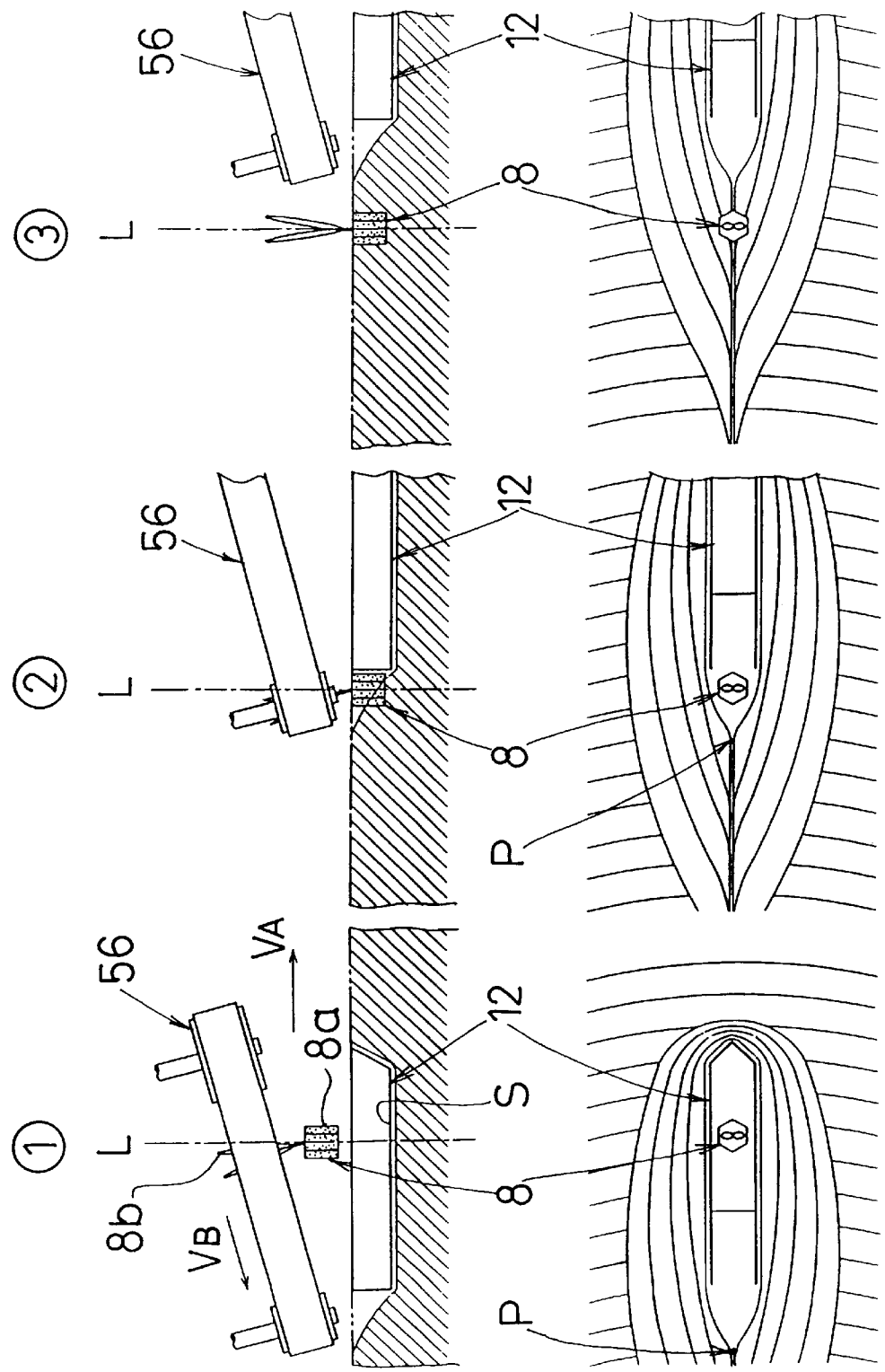
FIG. 10 shows processes of transplanting using a machine for transplanting according to the first embodiment of the present invention.

Also, in the first embodiment of the present invention, since the displacement velocity $V_A$ of the body 10 and the carrying velocity $V_B$ of the seedlings 8 with soil of the first and second conveyors 55, 56 is the same ($V_A = V_B$), as shown in FIG. 10, the seedlings 8 during carrying with the second conveyor 56 stand still at a certain position L to the field surface G. Therefore, if the body 10 continues to move at the velocity $V_A$, the seedlings 8 with soil, as shown at ①–③ in FIG. 10, at the stationary position L descend and contact vertically the bottom of the planting groove S and is released. That is, to the seedlings 8 with soil, at the time of contacting the field, any inertia from the body 10 or the second conveyor 56 does not act on the seedlings 8, which prevents the seedlings 8 from falling over. Further, soil around the planting groove S formed by the opener 12, as shown in FIG. 10, collapses as the opener 12 passes and joins at the point P just after the trailing end of the opener 12 (①), but the seedlings 8 with soil contact the field G just in advance of the joining point P (②), so that, there is no risk of the seedlings 8 riding on the joined soil and fallen down, rather the root block portion 8a of the seedlings 8 with soil is smoothly buried with the joined back soil (③).

Figure 11:
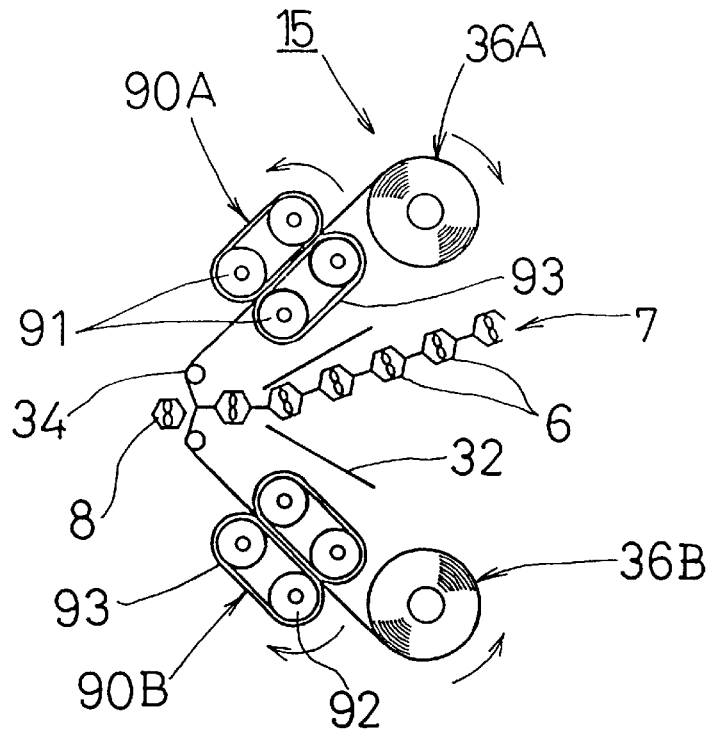
FIG. 11 shows an example of a variation in the strips peeling apparatus of the first embodiment of the present invention.

The taking-out rollers 35A, 35B can be, for instance, as shown in FIG. 11, replaced with a pair of conveyors 90A, 90B. Each pair of conveyors 90A, 90B are formed as endless belts 93 hung between driving pulleys 91 and follower pulleys 92. The rotation of the driving mechanism 40 drives the driving pulleys 91 and the strips of 3A and 3B are taken out by the clamping force between the endless belts 93.

Figure 12:
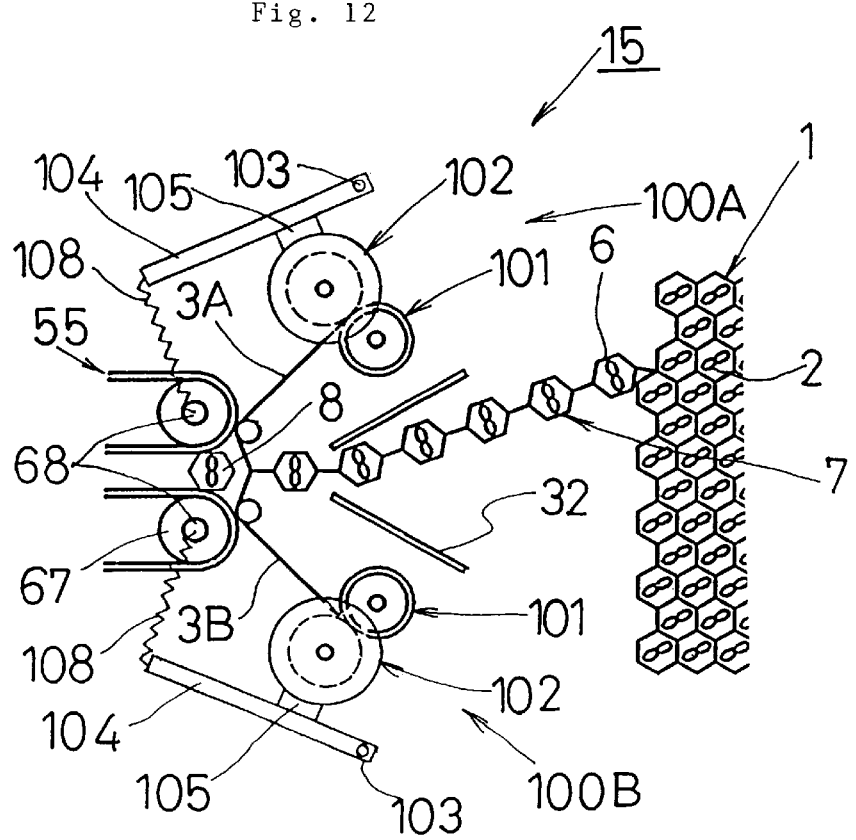
FIG. 12 shows the characterized portion of a second embodiment of the present invention.
Figure 13:
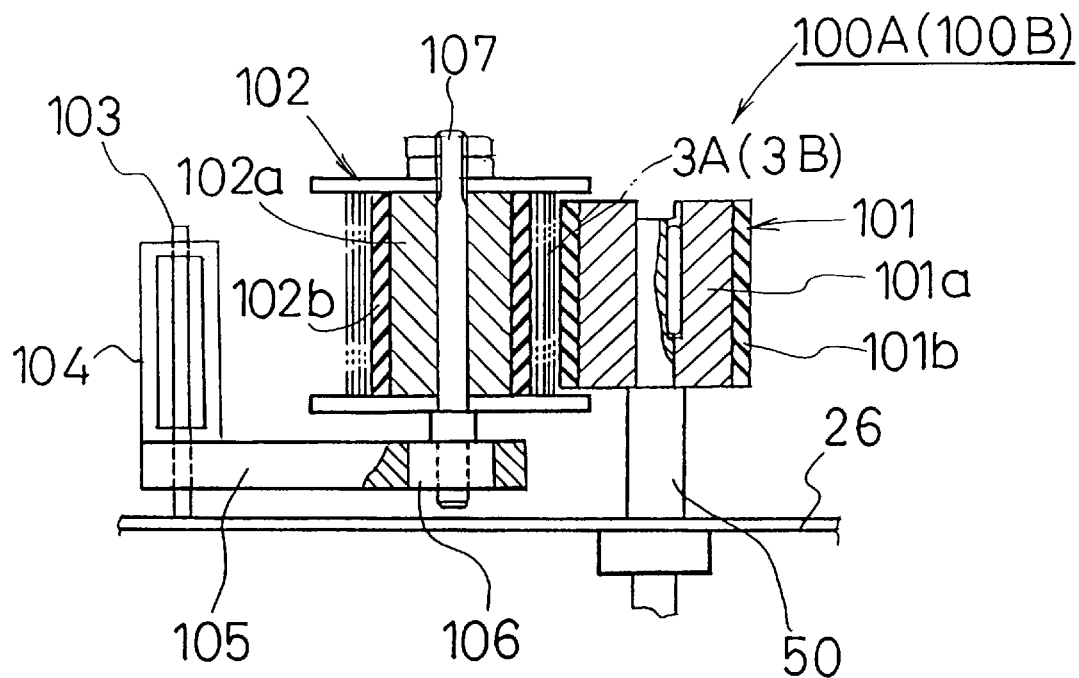
FIG. 13 is a sectional view of a taking out unit forming the strips peeling off apparatus shown in FIG. 12.

FIGS. 12 and 13 show a second embodiment of the present invention. The feature of the second embodiment of the present invention resides in that the functions of the above-discussed pair of taking-out rollers 35A, 35B of the strips peeling off apparatus 15 and the pair of winding reels 36A, 36B are combined into one taking-out unit 100A, 100B. That is, each of the taking-out units 100A, 100B comprises a driving roller 101 coupled and fixed onto a rotary shaft 50 (FIG. 8) to be driven by the driving mechanism 40, and one winding reel 102 for winding the strips 3A, 3B in cooperation with the driving roller 101.

The above-mentioned winding reel 102 is supported rotatably on the tip end of a supporting arm 105 extending from a turning plate 104, which is turned on a shaft 103 supported on the support plate 26 of the body 10 through a bearing 106 and rotary shaft 107. A free end of the turning plate 104 is biased always resiliently into the central side of the body 10 so that each of the winding reels 102 is pressed onto the circumference of the driving roller 101. The driving roller 101 and the winding reel 102 are made from, as shown in FIG. 13, a compound member comprising a plastic ring 10b and a plastic ring 102b having a little resiliency respectively. The surface of each plastic ring 101b, 102b is concavo-convex, for example, having serration (not shown), to increase a friction resistance between the strips 3A, 3B.

In the strips peeling off apparatus 15 having the above strips taking-out unit 100A, 100B, the two strips of 3A, 3B are taken out from a series of pots 7 toward the front side of the body while turning around the pair of guide members 34 respectively, and the taken out ends thereof are fixed on the winding reels 102 through the driving rollers 101 of the taking-out units 100A, 100B and the winding reels 102. When the body 10 moves in the advancing direction F while the ground gliding plate 11 is in contact with the field surface G, the rolling wheels 29 mounted on the body 10 roll on the field surface G. The rotation of the rolling wheels 29 is transmitted simultaneously to the strips peeling off apparatus 15 and the carrying conveyor 16 through the driving mechanisms 40, 60 (FIG. 8), and thereby the driving roller 101 of the taking-out units 100A, 100B is rotated. Then, since the winding reel 102 presses the strips 3A, 3B resiliently against the circumference of the driving roller 101 by the spring force of the compressed spring 108, the winding reel 102 rotates, and eventually a tension acts on the strips 3A, 3B. A force in the peeling off direction is applied to the series of pots 7, so that the two strips 3A, 3B are peeled off gradually to the right and left, and the seedlings 8 with soil exposed from each pot 6 are clamped and carried by the first and second conveyors 55, 56 to be planted in the planting groove S.

On the other hand, when each of the strips 3A, 3B peeled off is wound around the corresponding winding reel 102, since the circumferential velocity thereof is synchronized with the taking-out velocity, there is no risk where any unnecessary force is applied to the strips 3A, 3B. That is, according to the second embodiment, it is not necessary to prepare a means (spring etc.) which regulates the circumferential velocity automatically like in the first embodiment. In addition, it may be unnecessary to provide the special driving force transmitting mechanism 54 and the structure of the strips peeling off apparatus 15 becomes simpler than that of the first embodiment.

Figure 14:
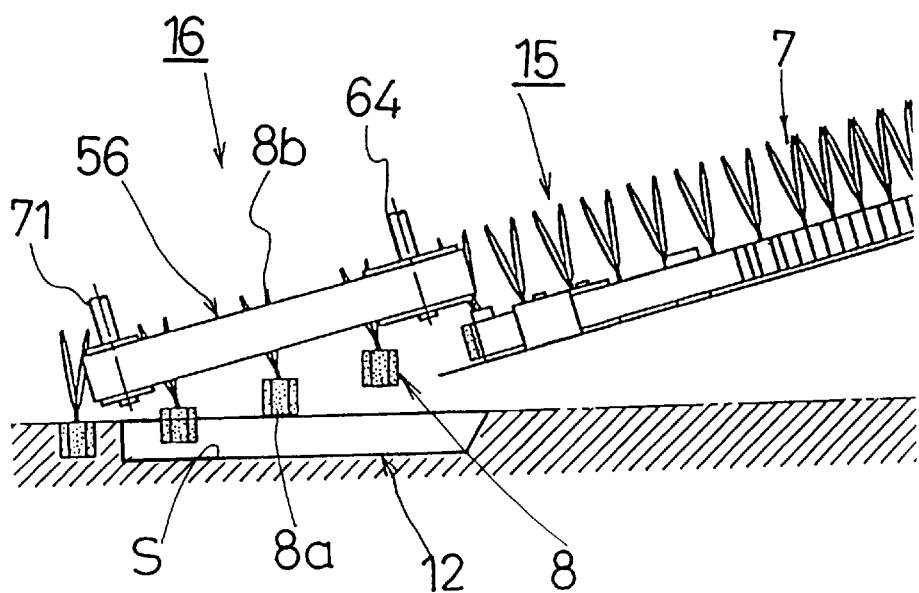
FIG. 14 is a side view of the characterized portion of a third embodiment of the present invention.
Figure 15:
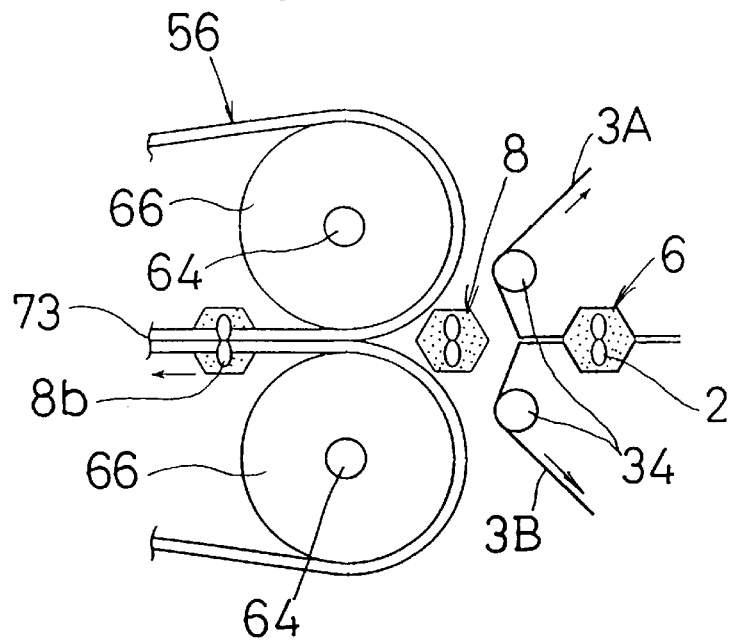
FIG. 15 is an enlarged view of one part of FIG. 14.

FIGS. 14 and 15 show a third embodiment of the present invention. The feature of this embodiment resides that, the first conveyer 55 in the carrying conveyor 16 in the first embodiment of the present invention is omitted and merely the second conveyor 56 is used. In this case, the second conveyor 56 is disposed in such a manner as its initial end is located nearby the pair of guide member 34 of the strips peeling off apparatus 15. In this third embodiment, the second conveyor 56 clamps the leaf portion 8b of the seedlings 8 with soil fed from the strips peeling off apparatus 15 and carries them toward the rear side of the body and, as well as in the first embodiment, feed the seedlings 8 into the planting groove S formed by the opener 12 to carry out the transplanting similarly as in the first embodiment.

Figure 16:
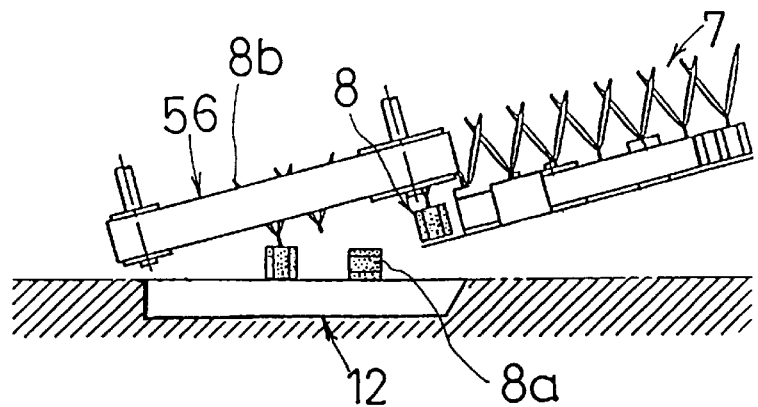
FIG. 16 explains matters to pay attention in using the third embodiment as a machine for transplanting according to the present invention.

According to the third embodiment of the present invention, because the first conveyor 55 is omitted the structure of the carrying conveyor 16 and the driving mechanism 60 is reduced downsizing the machine for transplanting. However, as shown in FIG. 16, in the case where the leaf portions 8b of adjacent seedlings 8, 2 overlap each other when taken out from a series of pots 7, at the time of clamping a seedlings 8 with soil fed from the strips peeling off apparatus 15 by the second conveyor 56, a following seedling 2 still in the form of a series of potted seedlings is also clamped together causing it to be prematurely pulled out.

Figure 17:
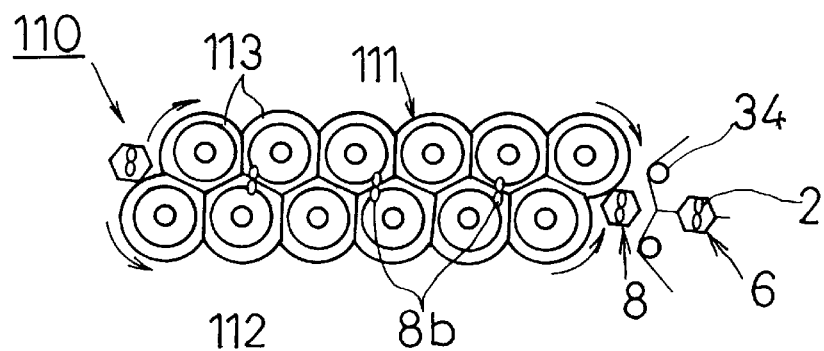
FIG. 17 is a plan view of an example of a variation of the carrying conveyor used in the present invention.

The second conveyor 56 forming the above-discussed carrying conveyor 16, as shown in FIG. 17, may be formed as a roller conveyor 110 consisting of two rows of a plurality of rotary rollers 111. In this case, each roller 111 is formed with a compound structure in which a core 112 is coupled with a ring 113 having flexibility and each roller is disposed so that every ring 113 is pressed against another. The thus formed roller conveyor 110 clamps the seedling 8 with soil fed from the strips peeling off apparatus 15 between the rings 113 of each roller 111 and carries them in turn toward the rear side of the body, which functions identically with the second conveyor 56. It is a matter of course that this roller conveyor 110 may use in place of the first conveyor 55 in the first embodiment.

Figure 18:
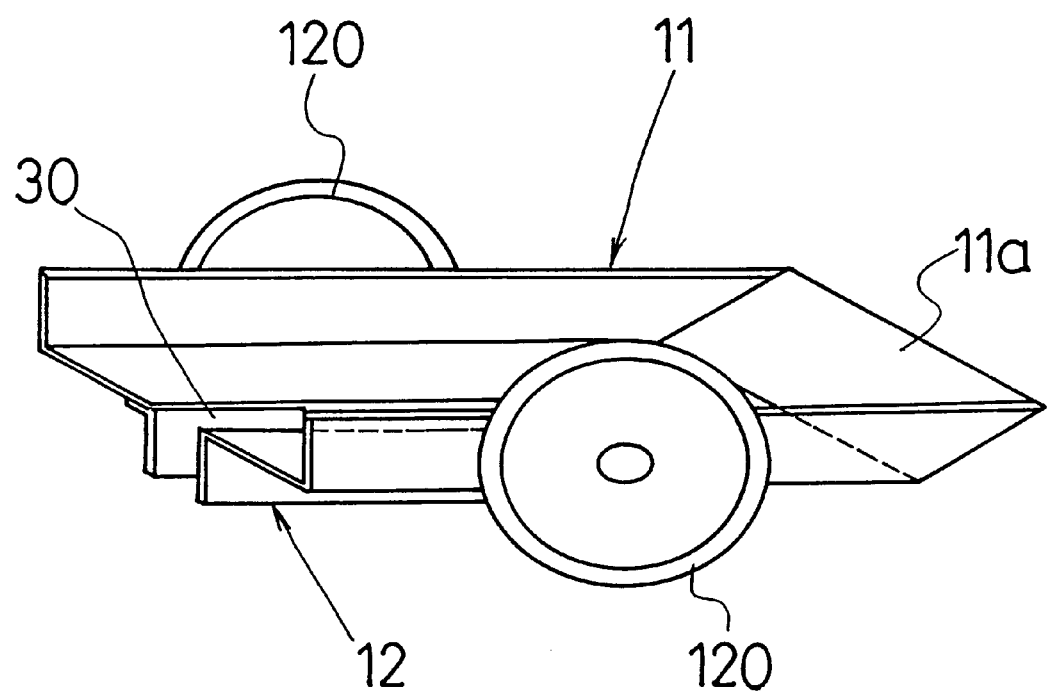
FIG. 18 is a perspective view of an example of a variation of the body used in the present invention.

Further, the above-discussed body 10, as shown in FIG. 18, may be constructed with rolling wheels 120 provided on both sides of the ground gliding plate 11. In this case, the body 10 is supported by this pair of rolling wheels 120 and the above-mentioned pair of rolling wheels 29 disposed at the front side on the field surface G so that, although the total weight is increased with the load of, for example, the strips peeling off apparatus 15 and the carrying conveyor 16, its displacement becomes easy thereby reducing the necessary human power.

In the present invention, the above-mentioned body 10 may be operated with a power source in place of a human, or may be drawn by, for example, a tractor. In the case where the tractor is driven by any power, for example, an engine, any electric motor loaded on the body 10 may be driven by the same to thereby drive the rolling wheels 29 or wheels 120, or an electrical motor assembly may drive the rolling wheels 29 or wheels 120 directly.

Further, in the present invention, a special power source such as electric motors and engines may be used as a driving power source for the above-mentioned strips peeling off apparatus 15 and the carrying conveyor 16, in place of the rolling wheels 29 of every embodiment. Such a special power source can be installed at appropriate position on the body 10.

In the present invention, the selection of the material to be used for the strips 3A, 3B to form the above series of pots 7 is arbitrary, and can be, for example, paper, plastic sheet or cloth. Further, it is also arbitrary how to bond these strips. In place of bonding with water resistant adhesives 4, the strips 3A, 3B can be for instance, bonded by heat, solvent or sewing.

As explained in detail, according to the machine for transplanting, by setting the ratio between the peeling velocity of the strips peeling apparatus and the carrying velocity of the seedlings with soil by the carrying conveyor, the pitch between the seedlings to be transplanted can be arbitrarily selected so that the applicable scope becomes eventually broader.

Further, since the machine of the present invention is formed merely by putting the strips peeling off apparatus and the carrying conveyor on the conventional body of a simple type of ground-contacting planting machine, the total dimension is not large and can be downsized.

Further, since the machine for transplanting of the present invention can use the current series of pots in many uses, it can maintain the advantage of concentric growing of seedlings. In addition, since it can transplant the seedlings with soil, the seedlings are not prevented from growing roots due to the pot, which leads to a general and high applicability of the present invention.

What is claimed is:

1. A machine for transplanting seedlings onto a field in synchronization with moving the machine, the seedlings having been grown in soil in a multiple series of pots formed by bonding strips at a given, said machine comprising.
   a body having an opener to form a transplanting groove in a field and a rear end that declines downward with respect to the field in a direction opposite to an advancing direction of moving of the machine;
   a potted seedlings placing section disposed on the body at a front side in the advancing direction;
   a guide section for guiding a series of potted seedlings taken out in a row from the potted seedlings placing section;
   a strips peeling off apparatus for separating the bonded strips to expose the seedlings and soil; and
   a carrying conveyor, which is disposed approximately in parallel with an upper surface of the body so that the rear end of the conveyor comes close to the field and which clamps and conveys the seedlings and soil in a standing posture toward the rear end of the body, thereby feeding the seedlings and soil from the carrying conveyor into the transplanting groove.

2. The machine for transplanting seedlings according to claim 1, further comprising:

rolling wheels attached to the body which roll on the field in accordance with the moving of the body, wherein the rolling wheels function as a drive source for the strips peeling off apparatus and the carrying conveyor.

3. The machine for transplanting seedlings according to claim 2, wherein the rolling wheels function as the power source for driving the transplanting conveyor.

4. The machine for transplanting seedlings according to claim 1, wherein the strips peeling off apparatus is configured to take out the separated strips toward the front side of the body.

5. The machine for transplanting seedlings according to claim 1, wherein the carrying conveyor is configured to clamp leaf portions of the seedlings.

6. The machine for transplanting seedlings according to claim 1, wherein the carrying conveyor comprises a first conveyor for carrying the seedlings by clamping roots block portions of the seedlings and a second conveyor for clamping leaf portions of the seedlings, and wherein an initial portion of the second conveyor overlaps a trailing end of the first conveyor.

7. The machine for transplanting seedlings according to claim 1, wherein the carrying conveyor comprises a pair of belt conveyors.

8. A machine for transplanting seedlings onto a field, in synchronization with moving the machine, the seedlings having been grown in soil in a multiple series of pots formed by bonding strips at a given pitch, said machine comprising:

a body which moves on the field, the body being declined downward with respect to the field in a direction opposite to an advancing direction of moving the machine;

a transplanting conveyor disposed on the body approximately in parallel with an upper surface of the body so that a rear end of the transplanting conveyor comes close to the field for carrying the seedlings by clamping leaf portions of the seedlings, wherein a carrying velocity of the transplanting conveyor is determined by the moving velocity of the body so that the seedlings are fed individually directly onto the ground at a predetermined spacing.

9. The machine for transplanting seedlings according to claim 2, wherein the transplanting conveyor comprises a pair of belt conveyors.

10. The machine for transplanting seedlings according to claim 8, further comprising:

an opener for forming a transplanting groove at a rear end of the body, wherein the seedlings fed from the transplanting conveyor fall into the transplanting groove.

11. A strips peeling off apparatus for taking-out seedlings with soil continuously in a transplanting machine, the seedlings being grown in multiple series of pots formed by bonding strips at a given pitch, said strips peeling off apparatus comprising:

a potted seedling placing section configured to be disposed on a body of the transplanting machine;

a pair of guide members for guiding the strips separated from a series of potted seedlings in an advancing direction of moving of the body of the transplanting machine;

rotary taking-out means for clamping the strips guided around the pair of guide members respectively, the rotary taking-out means configured to be spaced on the body of the transplanting machine forward of the pair of guide members in the advancing direction; and a pair of winding reels for winding the strips taken out by the rotary taking-out means, the pair of winding reels configured to be spaced on the body of the transplanting machine forward of the pair of guide members and the rotary taking-out means in the advancing direction.

12. The strips peeling off apparatus according to claim 11, wherein the rotary taking-out means is disposed at a position where the strips taken out and turned around the pair of guide members are taken-out toward the potted seedlings placing section.

13. The strips peeling off apparatus according to claim 12, wherein the rotary taking-out means comprises a pair of rotary rollers each respectively biased against one of the pair of winding reels.

14. The strips peeling off apparatus according to claim 11, wherein the rotary taking-out means comprises two pair of rotary rollers.

15. The strips peeling off apparatus according to claim 11, wherein the rotary taking-out means comprises two pair of rotary belts.

* * * * *